(No Model.)
W. J. KAUFFMAN.
CARRIAGE POLE COUPLING.
No. 525,218. Patented Aug. 28, 1894.
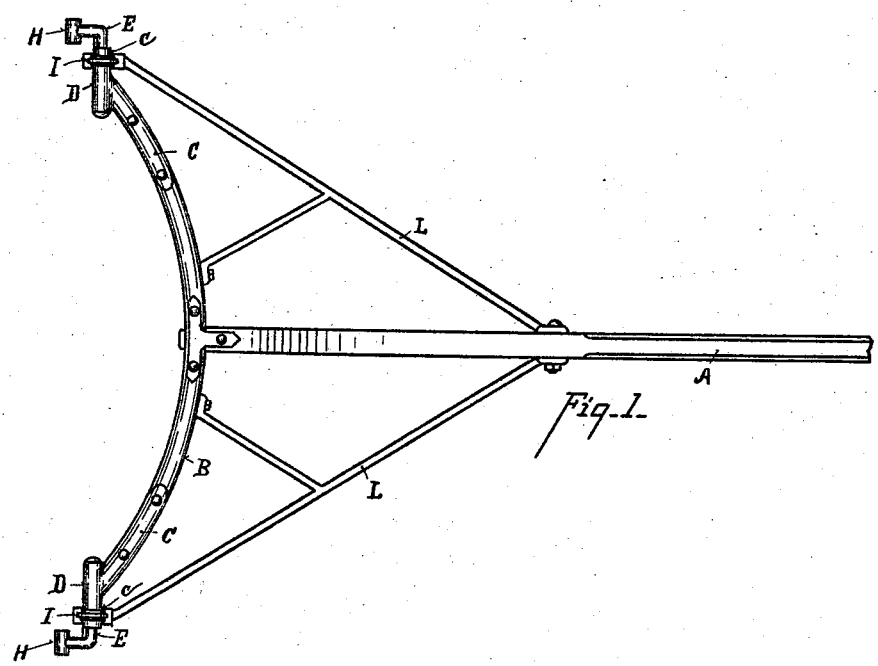
Attest
C. W. Miles
Oliver B. Kaiser
Inventor
W. J. Kauffman
By Wood & Boyd atty

United States Patent Office.

WILLIAM J. KAUFFMAN, OF MIAMISBURG, OHIO.

CARRIAGE-POLE COUPLING.

SPECIFICATION forming part of Letters Patent No. 525,218, dated August 28, 1894.

Application filed February 15, 1894. Serial No. 500,228. (No model.)

*To all whom it may concern:*

Be it known that I, WILLIAM J. KAUFFMAN, a citizen of the United States, residing at Miamisburg, in the county of Montgomery and State of Ohio, have invented certain new and useful Improvements in Carriage-Pole Couplings, of which the following is a specification.

My invention relates to improvements in the means for connecting the braces of a carriage pole to the cross-bar and in the construction and arrangement of the adjustable pole eyes at the ends of said cross-bar, as hereinafter described and claimed.

The various features of my invention are fully set forth in the description of the accompanying drawings, making a part of this specification, in which—

Figure 1 is a top plan view of my improvement. Fig. 2 is an enlarged detail view of the pole coupling. Fig. 3 is a perspective view of the pole eye. Fig. 4 is a perspective view of one of the socket straps.

The essential feature of my invention consists of a socket-support for the shank of a pole-eye formed of two sections, the forward ends of which form knee straps C, C' which are rigidly connected to the curved cross-bar B and the rear portions form semi-tubular socket supports for the shanks of the pole-eye.

Referring to the drawings, A indicates a vehicle pole, B the cross-bar thereof, and L the braces. To the opposite ends of the cross-bar B are secured the socket-supports for the shanks of the pole-eye which are constructed as follows. The socket-supports each consist of two semi-tubular sections D, D, having formed integral therewith arms C C' extending forward at an angle thereto and adapted to be secured to the upper and under side of the cross-bar B by bolts or other suitable fastening devices. The sections D, D, when thus secured in position form a cylindrical bearing, closed at one end, for the reception of the shank of the pole-eye H. Each of the sections D is provided with a rabbet at one of its edges, said rabbets, when the two sections are brought together to form the cylindrical bearing, forming a recess *a* within which rests a rib *b*, formed on the shank E of the pole-eye H, and which prevents said shank from turning in the bearing. The upper section of the bearing is provided with a grooved boss *c* for the reception of a U-shaped clip-bolt I which rests within said grooved boss, and at its ends passes through a yoke-plate *e* and is secured in place by nuts 2, 2, tapped over the ends of the said clip-bolt. The yoke-plates *e* form extensions of the braces L which at their forward ends are secured to the pole A, and are formed integral therewith. *b'* represents a concave boss arranged between the under side of the lower section D of the bearing and the yoke plate *e* and is provided with lateral perforated ears *d, d*, through which pass the ends of the clip-bolt I. The shank E of the pole-eye H rests within the bearing composed of the two sections D, D, and is clamped tightly therein by the clip-bolt I and nuts 2, 2. The shank of the pole-eye is readily adjusted longitudinally to any desired gage of axle draw-irons by loosening the nuts 2, sliding the shank E in the bearing to the desired position, and screwing up the nuts 2 to tightly clamp the sections D together about the shank. It is obvious that the knee straps could be connected to the hounds of the cross-bar when the curved cross-bar is not employed. By the construction herein shown the coupling composed of the two sections can be cheaply made of malleable iron and the shank of the pole-eye supported with but little fitting.

Having described my invention, what I claim is—

1. In combination with a pole and cross-bar, of a coupling composed of two sections, each section being composed of knee straps clamped upon the cross-bar, and sockets D forming a bearing for the shank of the pole-eye, and a clamp for rigidly connecting said coupling upon the shank of the pole-eye, substantially as specified.

2. A coupling for the shank of a pole-eye composed of two sections, one section being composed of a knee strap C, and a semi-tubular socket resting upon the shank of a pole-eye and having a grooved boss *c*, the other section being composed of the knee strap C' and semi-tubular socket D, and the boss *d*, the parts of each of said sections being integral and readily attached to the cross-bar, and means for clamping them together upon the shank of the pole-eye, substantially as specified.

3. In combination with the semi-tubular shank supports D each provided with knee straps clamped upon the cross-bar of the pole, a clip-bolt I, and the brace L secured to the pole at one end and forming the yoke-plate E at the opposite end, substantially as specified.

4. The combination with the pole A and cross-bar B, of the split tubular bearing D having an internal longitudinal recess $a$ and provided with knee straps C C' secured to said cross-bar, the cylindrical pole-eye E provided with the head H and having a longitudinal rib $b$ engaged in the recess $a$ of the split tubular bearing, the pole-brace L provided with the yoke $e$, and a clip for drawing together the yoke $e$ and tubular bearing D and holding the pole-eye rigidly in its adjusted position, substantially as described.

In testimony whereof I have hereunto set my hand.

WILLIAM J. KAUFFMAN.

Witnesses:
W. A. REITER,
ED ROGERS.